United States Patent
Nguyen

(10) Patent No.: US 9,362,844 B2
(45) Date of Patent: Jun. 7, 2016

(54) METHOD OF DERIVING SWITCH CURRENT SIGNALS IN A RECTIFIER

(71) Applicant: Hamilton Sundstrand Corporation, Charlotte, NC (US)

(72) Inventor: Vietson M. Nguyen, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 397 days.

(21) Appl. No.: 13/918,521

(22) Filed: Jun. 14, 2013

(65) Prior Publication Data

US 2014/0369101 A1 Dec. 18, 2014

(51) Int. Cl.
*H02M 7/217* (2006.01)
*H02M 1/084* (2006.01)

(52) U.S. Cl.
CPC ............ *H02M 7/2173* (2013.01); *H02M 1/084* (2013.01); *H02M 7/217* (2013.01)

(58) Field of Classification Search
CPC .... H02M 1/084; H02M 7/217; H02M 7/2173
See application file for complete search history.

(56) References Cited

U.S. PATENT DOCUMENTS

| 2002/0154526 A1* | 10/2002 | Sakai ................. | H02M 1/4216 363/132 |
|---|---|---|---|
| 2008/0013352 A1* | 1/2008 | Baker .......................... | 363/125 |
| 2008/0259663 A1* | 10/2008 | Perkinson .................... | 363/126 |
| 2009/0295229 A1* | 12/2009 | Harke ................. | H02M 7/217 307/75 |
| 2011/0134672 A1* | 6/2011 | Sato et al. .................... | 363/126 |
| 2012/0140537 A1* | 6/2012 | Fattal ........................... | 363/126 |
| 2014/0334208 A1* | 11/2014 | Nguyen ........................ | 363/126 |

FOREIGN PATENT DOCUMENTS

EP 2590312 A1 5/2013

OTHER PUBLICATIONS

Drofenik U et al: "Comparison of not synchronized sawtooth carrier and synchronized triangular carrier phase current control for the VIENNA rectifier I", Industrial Electronics, 1999. ISIE '99. Proceedings of the IEEE International Symposium on Bled, Slovenia Jul. 12-16, 1999, Piscataway, NJ, USA, IEEE, US, vol. 1, Jul. 12, 1999, pp. 13-19, XP010354140, DOI: 10.1109/ISIE.1999.801749 ISBN: 978-0-7803-5662-7.

Johann W Kolar et al: "A Novel Three-Phase Utility Interface Minimizing Line Current Harmonics of High-Power Telecommunications Rectifier Modules", IEEE Transactions on Industrial Electronics, IEEE Service Center, Piscataway, NJ, USA, vol. 44, No. 4, Aug. 1, 1997 XP011023284, ISSN: 0278-0046.

Search Report and Opinion issued by the European Patent Office on Mar. 17, 2015 for European Patent Application 14172345.

* cited by examiner

*Primary Examiner* — Jue Zhang
(74) *Attorney, Agent, or Firm* — Locke Lord LLP; Scott D. Wofsy; Christopher J. Cillié

(57) ABSTRACT

A method of deriving synchronous switch currents for a three-phase Vienna-type active rectifier that includes the step of generating gate driver signals for each phase of the rectifier by pulse width modulation, wherein the gate driver signals include a top gate driver signal, a clamp gate driver signal and a bottom gate driver signal, and the step of deriving synchronous switch current signals from the gate driver signal, wherein the synchronous switch current signals include a top gate switch current signal, a clamp gate switch current signal and a bottom gate switch current signal.

16 Claims, 14 Drawing Sheets

Topology A

Topology B

Topology C

Topology D

Topology E

METHOD OF DERIVING SWITCH CURRENT SIGNALS IN A RECTIFIER

BACKGROUND OF THE INVENTION

1. Field of the Invention

The subject invention relates to synchronous rectification, and more particularly, to a method of deriving the individual switching current signal for the currents flowing in each switch of the synchronous rectifier switches utilized in a three-level Vienna-type active rectifier.

2. Description of Related Art

Synchronous rectification is a concept that has been applied in the past, particularly in DC-DC converters at low output voltage levels. In those converters where conventional circuit topologies were utilized, a voltage drop of 0.4 V to about 1.0 V in the output rectifier is common and would be converted into a significant loss, since the output voltage of a typical DC-DC power converter in these applications is usually only about 1.0 or 2.0V.

Synchronous rectification involves the use of a power MOSFET connected in parallel with a diode, wherein the MOSFET is configured to be turned on when the diode is conducting, so that current flow is re-directed through the MOSFET. Since the MOSFET operates with lower resistance than the diode, the voltage drop across the circuit will be lower and more efficient.

Given the efficiencies associated with synchronous rectification, it would be beneficial to apply this principle to a full power circuit of a unidirectional active rectifier, also known as a Vienna Rectifier, in order to reduce the static losses across the circuit. This would be particularly advantageous in power inverter/converter topologies employed in aerospace applications, wherein switching speed and efficiency are sought after goals.

It is also known that the currents flowing in a synchronous rectifier switch must flow in the direction of the diode, not in a reverse direction, due to unidirectional power flow restrictions in aircraft power systems. Because of this restriction, it would be beneficial to know the currents flowing in the synchronous rectifier switches of the Vienna Rectifier in order to prevent these switch currents from flowing back to their source.

SUMMARY OF THE INVENTION

The subject invention is directed to a new and useful method of deriving switch currents in a rectifier that includes the steps of generating gate driver signals and subsequently deriving switch currents from the gate driver signals. The method further includes the step of using analog switches driven by the gate driver signals to derive the switch currents.

The method also includes the step of providing a first analog switch for deriving the top switch current signal, a second analog switch for deriving the clamp switch current signal and a third analog switch for deriving the bottom switch current signal. Line current is sensed upstream from the power switch block of a Vienna-type active rectifier whether a synchronous rectification principle is applied.

The gate driver signals derived to drive the gates of the power switched (also used to drive the gates of the analog switches to provide the individual switch current signals) are preferably generated by a pulse width modulator and include a top gate driver signal, a clamp gate driver signal and a bottom gate driver signal. Preferably, the top and bottom gate driver signals are delayed with respect to the clamp gate driver signal. The step of generating the gate driver signals preferably includes the step of comparing a nearly sinusoidal control signal from a controller with two triangular waveforms.

The subject invention is also directed to a method of deriving synchronous switch currents signals for a three-phase Vienna-type active rectifier that includes the step of generating gate driver signals for each phase of the rectifier by pulse width modulation, wherein the gate driver signals include a top gate driver signal, a clamp gate driver signal and a bottom gate driver signal. The method further includes the step of deriving synchronous switch currents from the gate driver signals and the sensed line current signal (which comes from a current sensor installed in front of the rectifier power semiconductor switch block), wherein the synchronous switch current signals include a top gate switch current signal, a clamp gate switch current signal and a bottom gate switch current signal.

The method further includes the step of using analog switches driven by the gate driver signals to derive the individual switch current signals, wherein the analog switches include a first analog switch driven by the driver signal of the top gate to provide the top switch current signal, a second analog switch driven by the driver signal of the clamp gate to provide the clamp switch current signal and a third analog switch driven by the driver signal of the bottom gate to provide the bottom switch current signal. Preferably, the top and bottom gate driver signals are delayed with respect to the clamp gate driver signal.

These and other features of the subject invention and the manner in which it is employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to use the subject invention without undue experimentation, preferred embodiments thereof will be described in detail herein below with reference to certain figures, wherein.

DETAILED DESCRIPTION OF PREFERRED EMBODIMENTS

In the following detailed description of the subject invention, there is illustrated a plurality of different topologies for Vienna-type active rectifiers, many of which incorporate silicon carbide (SiC) synchronous rectifiers. As used herein, the term SiC synchronous rectifier refers to a combined module block that includes a SiC Schottky diode connected in parallel with a SiC MOSFET. The SiC MOSFET is configured to be turned on when the diode is conducting, so that current flow is re-directed through the MOSFET rather than the diode.

A SiC MOSFET is designed to have very low resistance when it is turned on, and therefore it's use leads to a lower voltage drop across the circuit than if only a SiC Schottky diode were used. Consequently, the module conduction loss is significantly reduced, as compared to a conventional rectifier or SiC Schottky diode.

Figure 1:
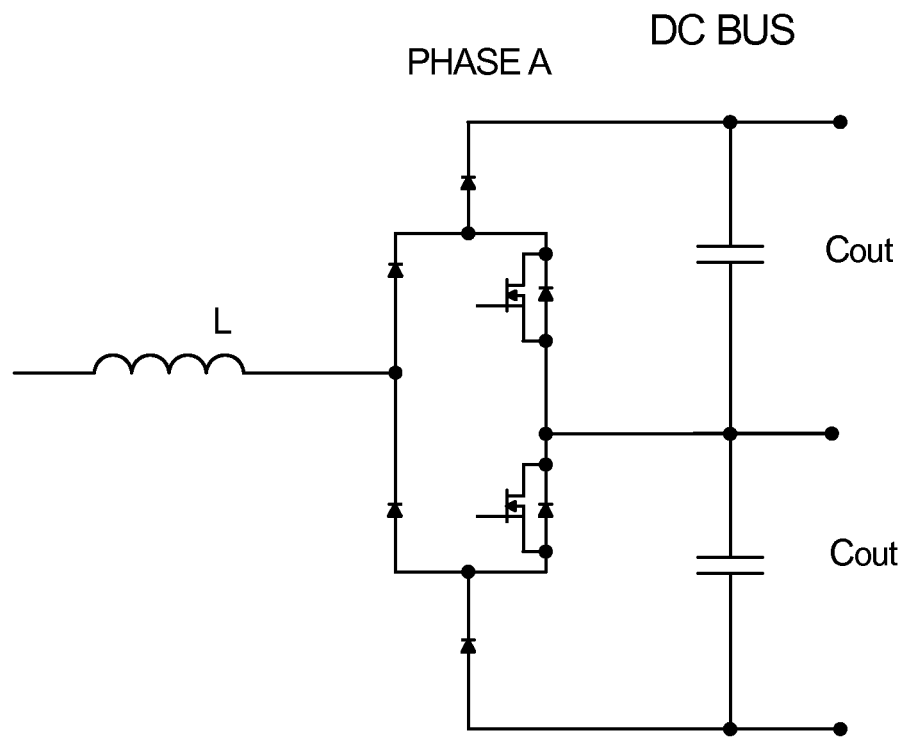
FIG. 1 is a schematic illustrating the topology of a single phase portion of a conventional three-phase Vienna-type active rectifier.

Referring now to the drawings, there is illustrated in FIG. 1 a single-phase portion of a three-phase conventional Vienna-type active rectifier. In this topology, for normal temperature operation, the two front-end diodes connected to inductor L are regular diodes. The two front end diodes need not be SiC type diodes in normal operating temperatures. Because these are diodes, there is no switching at the front-end of the rectifier.

For high frequency operation in the topology of FIG. 1, the top and bottom diodes should be SiC Schottky diodes. And, for both high frequency and high temperature operating conditions, all four of the diodes, including the two front end diodes as well as the top and bottom diodes should be SiC Schottky diodes. Thus, there is switching in the front end as well as in the top and bottom of the rectifier.

Figure 2:
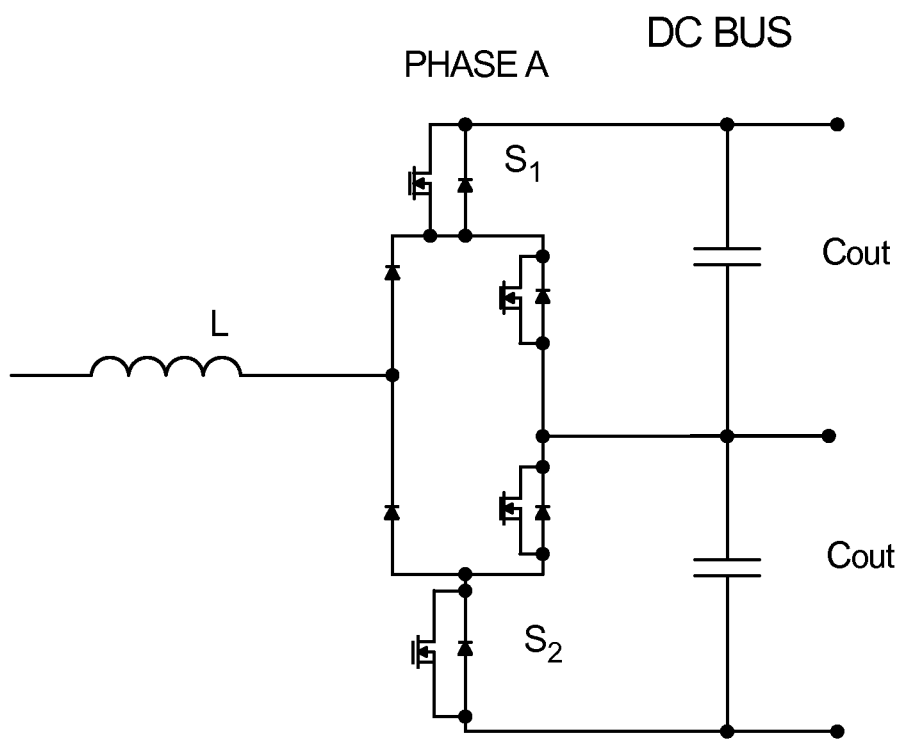
FIG. 2 is a schematic illustrating the topology of a single phase portion of a Vienna-type active rectifier as shown in FIG. 1, wherein the top and bottom diodes are silicon carbide (SiC) synchronous rectifiers.

Referring to FIG. 2, there is illustrated a single phase portion of a Vienna-type active rectifier similar to the topology shown in FIG. 1. In this topology the top and bottom diodes are replaced by two SiC synchronous rectifiers. At normal temperature operation, the two front-end diodes connected to inductor L need not be SiC Schottky type. Instead, these two diodes can be regular diodes that have low voltage drops. Here, the top and bottom diodes are provided as two SiC synchronous rectifier blocks (S1 and S2). Within each of these blocks, the SiC MOSFETs are used to further reduce the diode forward voltage drops, while still maintaining the rapid turn-on and turn-off properties of the Schottky SiC diode in the rectifier switch.

Figure 3:
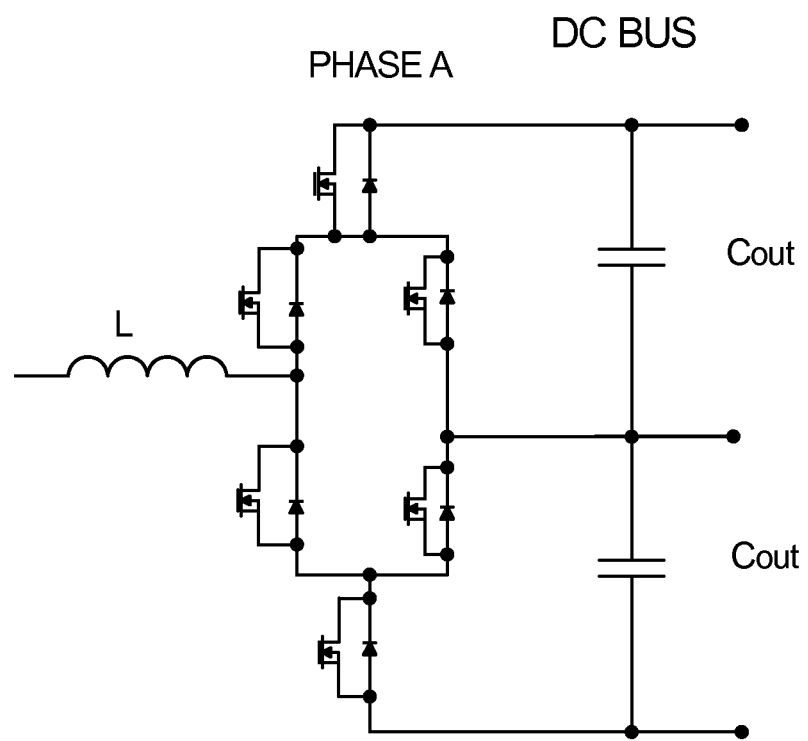
FIG. 3 is a schematic illustrating the topology of a single phase portion of a Vienna-type active rectifier as shown in FIG. 2, wherein the two front-end diodes as well as the top and bottom diodes are SiC synchronous rectifiers.

Referring to FIG. 3, there is illustrated a single phase portion of a Vienna-type rectifier similar to the topology shown in FIG. 2. In this topology, the two front end diodes are replaced by SiC synchronous rectifier blocks. This is particularly well adapted for high temperature and high frequency operating conditions. Furthermore, in this topology, the two source-connected synchronous rectifiers (i.e., the two blocks that are connected to the source inductor L) can be fully turned-on during the top-half and bottom-half of the source current half-cycles.

Figure 4:
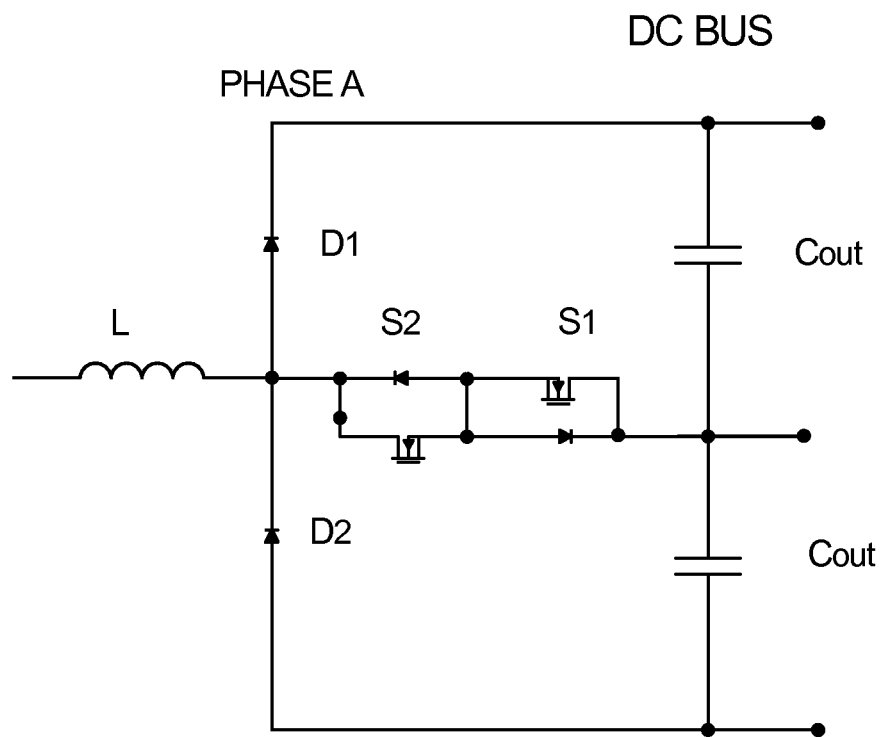
FIG. 4 is a schematic illustrating the topology of a basic Y-clamped active rectifier using clamped SiC Schottky diodes and a bidirectional switch.
Figure 5:
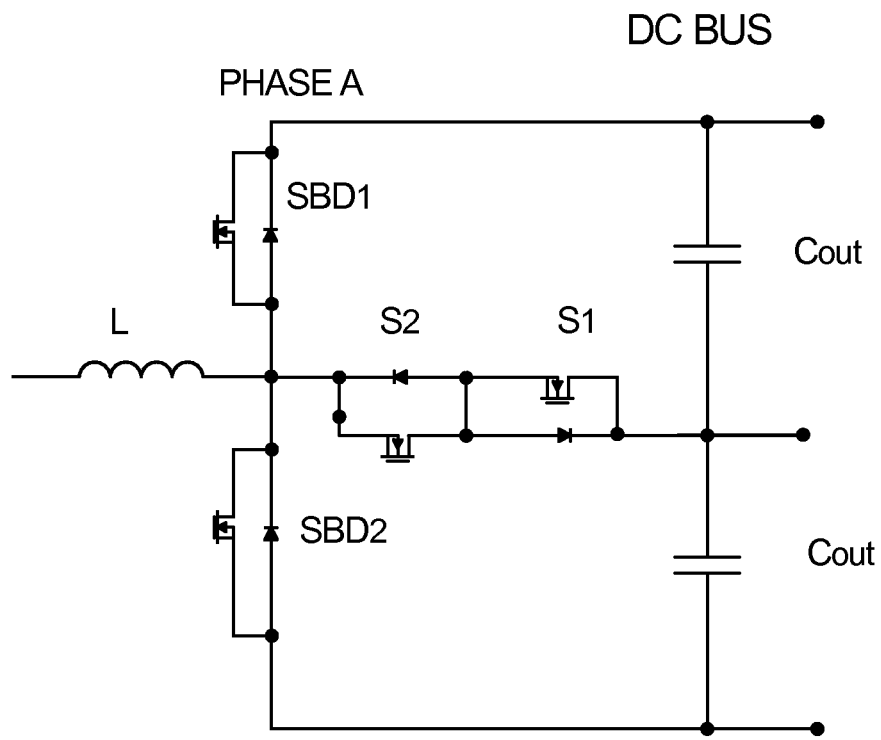
FIG. 5 is a schematic illustrating the topology of a Y-clamped active rectifier as shown in FIG. 4, wherein SiC MOSFETs are connected in parallel with SiC Schottky diodes.

Referring now to FIG. 4, there is illustrated a basic Y-clamped active rectifier that includes two clamped SiC Schottky diodes (D1 and D2) and a bidirectional switch containing two pairs of SiC Schottky diode and SiC MOSFETs connected in parallel (S1 and S2). The Y-clamped active rectifier of FIG. 4 can be modified as shown in FIG. 5, by replacing the SiC Schottky diodes (D1 and D2) with two SiC MOSFETs that are connected in parallel with SiC Schottky diodes (SBD1 and SBD2). Within these two blocks, the SiC MOSFETs are turned-on after their reverse parallel SiC Schottky diodes are turned-on and then turned-off shortly before their reverse parallel SiC Schottky diodes turned-off.

Figure 6:
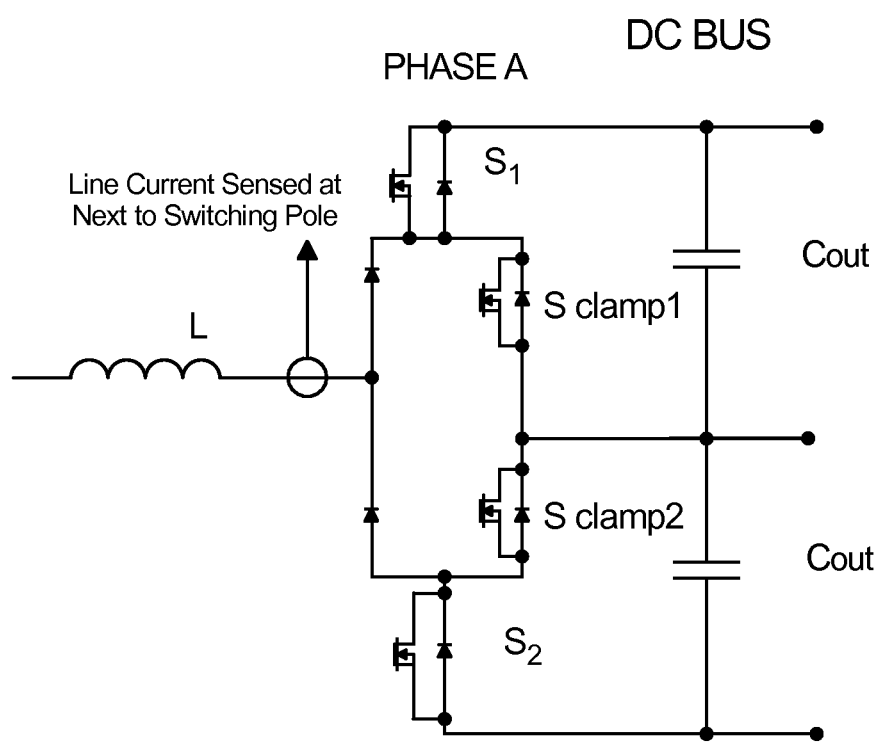
FIG. 6 is a schematic illustrating the topology shown in FIG. 2, wherein line current is sensed at a location next to the switching pole of the circuit.

Referring now to FIG. 6 there is illustrated a single phase portion of a Vienna-type active rectifier as shown in FIG. 2, wherein line current is sensed at a location that is next to the switching pole of the circuit, using a single current sensor. As explained in more detail below, current signals for the currents flowing inside the diodes (these are also the current signals of the current flowing in the corresponding synchronous rectifiers) of the Vienna-type active rectifier are sensed using a single current sensor for the phase. Moreover, using a single line current sensor per phase, placed next to the switching pole as shown in FIG. 6, the synchronous switch current signals for S1 and S2 and the clamp switch currents S Clamp 1 and S Clamp 2 of the rectifier can be derived using analog switches driven by derived gate signals, as explained in more detail below.

Figure 7:
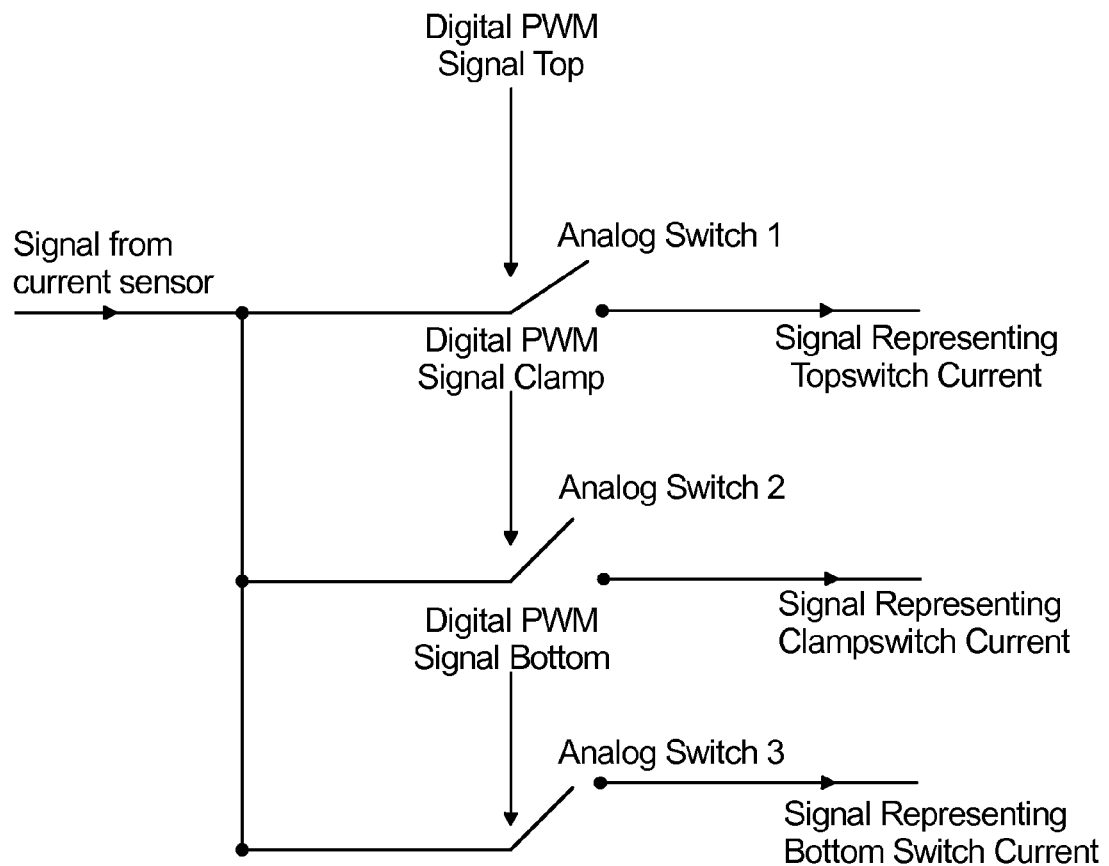
FIG. 7 is a schematic illustrating the analog switches of the switching pole for the single phase portion of the rectifier shown in FIG. 6, wherein the analog switches are driven by the gate driver signals to derive the switch currents for the rectifier.

Referring to FIG. 7, there is illustrated the switching pole containing the analog switches for each individual rectifier phase, which includes a first analog switch (Switch 1) for deriving the signal for the current flowing through the top switch of the rectifier phase, a second analog switch (Switch 2) for deriving the signal for the current flowing through the clamp switches of the rectifier phase and a third analog switch (Switch 3) for deriving the signal for the current flowing through the bottom switch of the rectifier phase. Line current signal is sensed and fed upstream to the three analog switches.

With continuing reference to FIG. 7, the gate driver signals generated by the pulse width modulator (PWM) are fed to the gates of the analog switches of each switching pole of each phase, which include a top gate driver signal, a clamp gate driver signal and a bottom gate driver signal. When each gate of the analog switches is closed (i.e., logic "1"), it will permit the sensed line current signal (as illustrated in FIG. 6) to pass through the analog switch to become a current signal representing the switch current of the corresponding switch of the rectifier, including, for example, the top and bottom synchronous rectifiers shown in the topology of FIG. 2.

Figure 8:
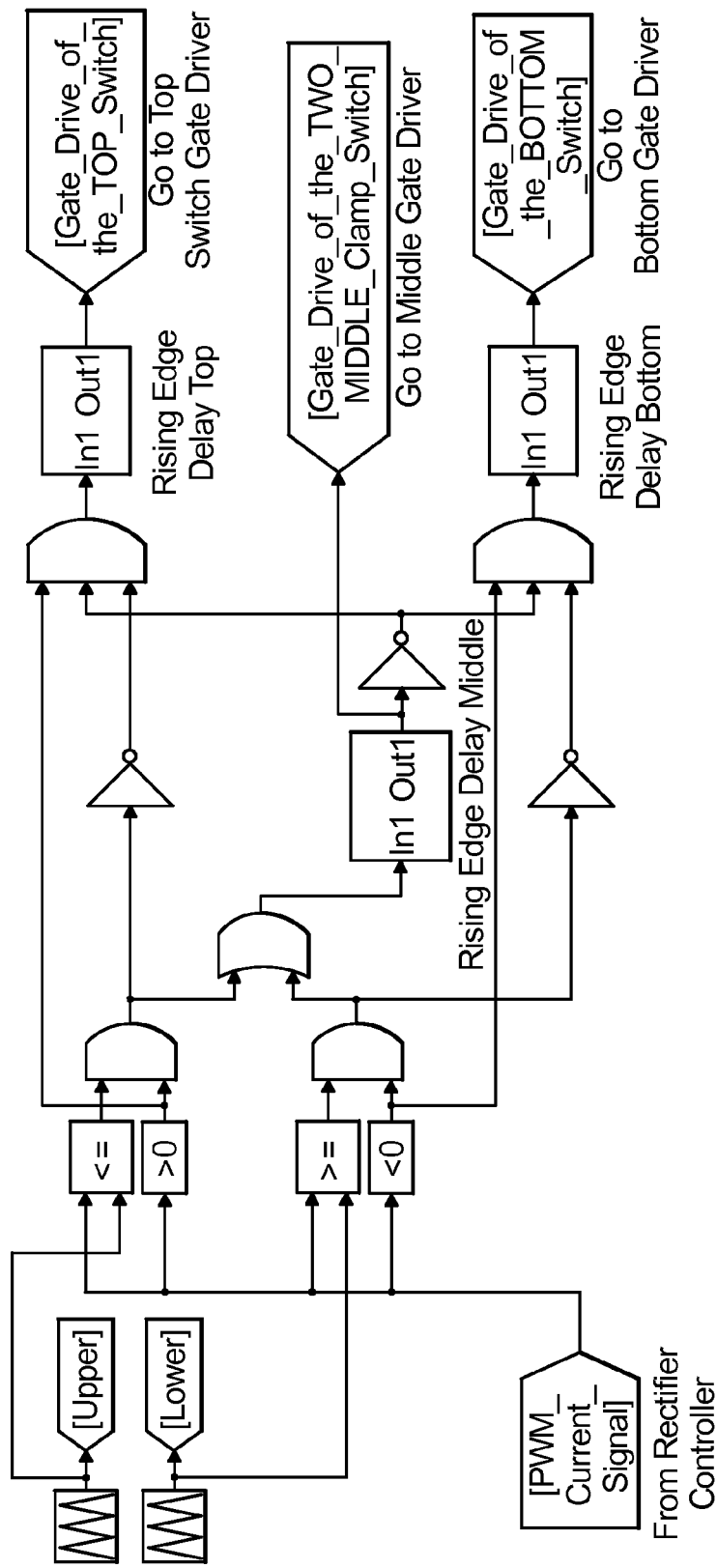
FIG. 8 is a block diagram of a pulse width modulator used to generate the control signals to the gates of the active rectifier switches for a single phase portion of the rectifier, with an illustration of the two signals of "upper" and "lower" triangular waveforms shown therewith in FIG. 8A.
Figure 8A:
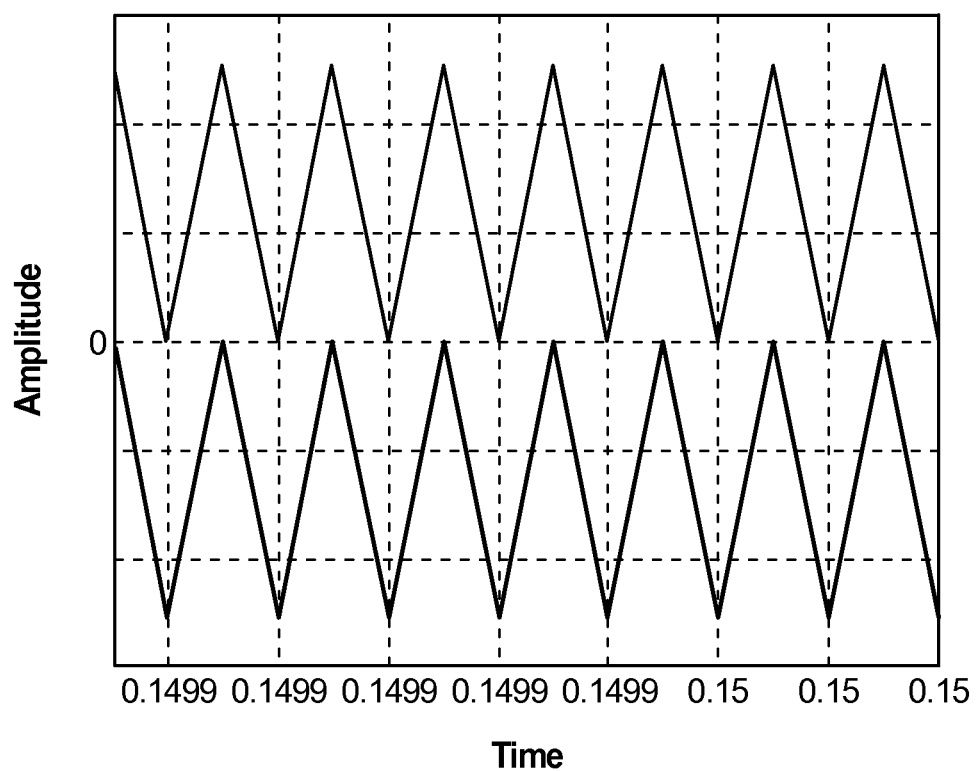

Referring now to FIG. 8, there is illustrated a block diagram of a pulse width modulator used to generate the control signals for each phase of the rectifier. That is, the PWM generates a control signal for the top, middle and bottom gates of the active rectifier switches, as shown in FIG. 7. More particularly, the PWM signals obtained from sine-triangular modulation method are used to drive the three gates of the analog switches of the switching pole.

Figure 9:
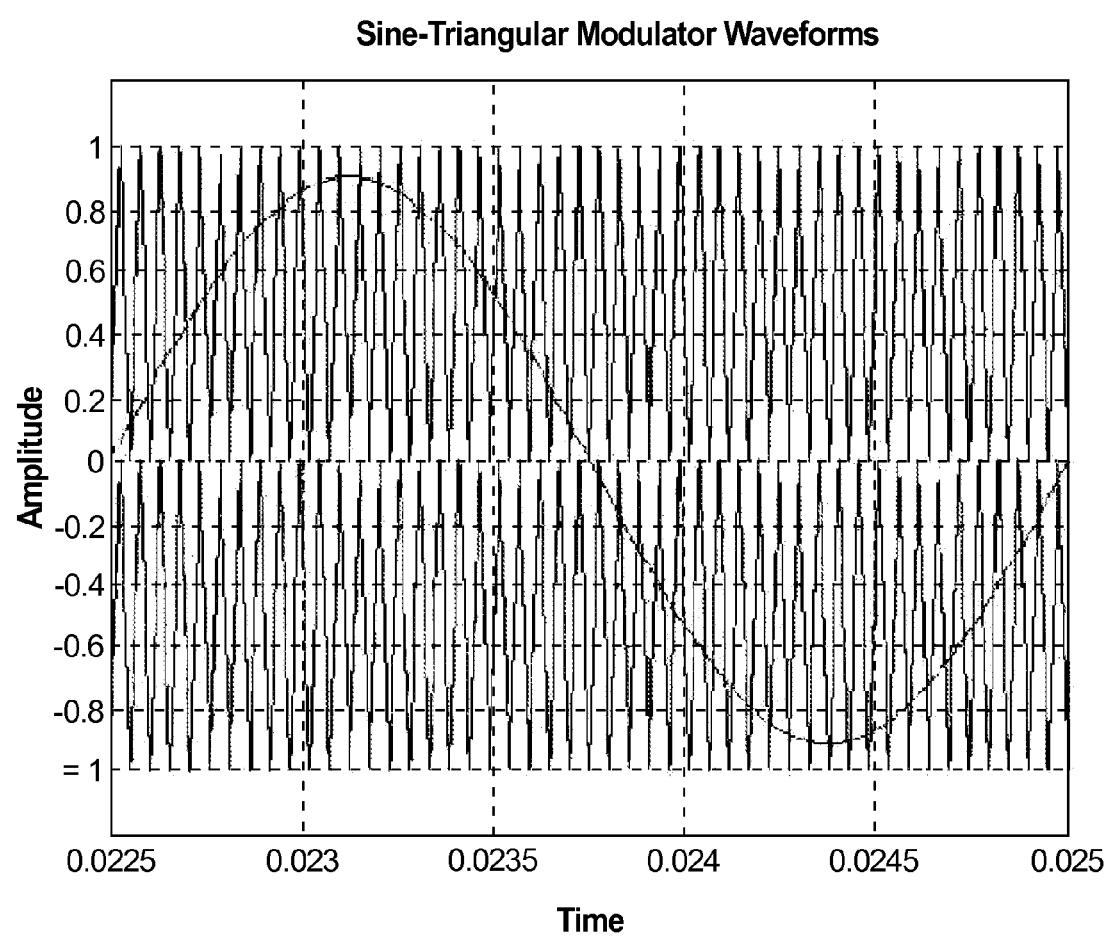
FIG. 9 is a graphical representation of sine-triangular modulator wave signals used to generate the gate driver signals to a Vienna-type active rectifier.

FIG. 9 shows an example of a sine-triangle modulation waveform used to create gate driver signals for a Vienna-type active rectifier (although as noted later that the sine-triangular modulation is not the only method to create the PWM signals). This is accomplished by comparing a "nearly" sinusoidal control signal (coming from a controller) with the two triangular waveforms. The amplitude of the sine wave can be up or down. In this example, a modulation frequency of 19.6 kHz and a modulation index of 0.9 at 400 Hz fundamental frequency are illustrated.

Those skilled in the art should readily appreciate that the examples disclosed and illustrated herein should not be construed to limit the scope of the subject invention to any particular embodiment or in any other way. These examples are merely illustrative of the manner in which the method of the subject invention may be applied in practice.

Figure 10:
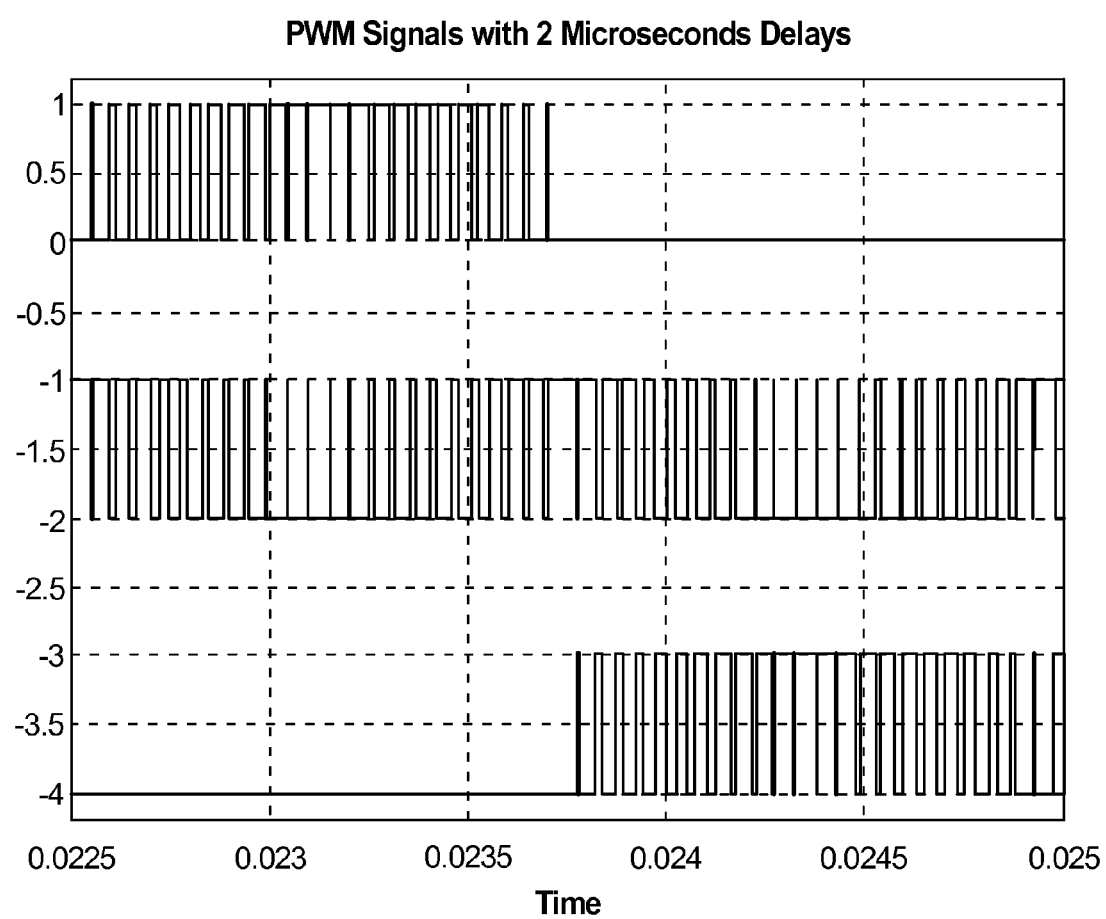
FIG. 10 is a graphical representation of exemplary gate driver signals derived from a pulse width modulator, wherein the top and bottom gate signals are delayed with respect to the middle clamp gate signal.

Referring to FIG. 10, there is illustrated the gate driver signals generated by the PWM. It is assumed that a few microseconds of delay exists from the top (or bottom) gate signal relative to the middle clamp gate signal. This delay is sufficient to prevent any shoot-through condition from occurring within the synchronous rectifier switches.

Those skilled in the art will readily appreciate that the clamp switch pair gate driver signal in the plot at the middle of FIG. 10 controls: the two middle switches in Topology A of FIG. 1; the two middle switches in Topology B of FIG. 2; the two right-side middle switches in Topology C of FIG. 3; and the two clamp switches in Topologies D and E of FIGS. 4 and 5. The two left-side middle switches in Topology C of FIG. 3 are turned on-and-off differently by the direction of the line source current at tow half-cycles.

Figure 11:
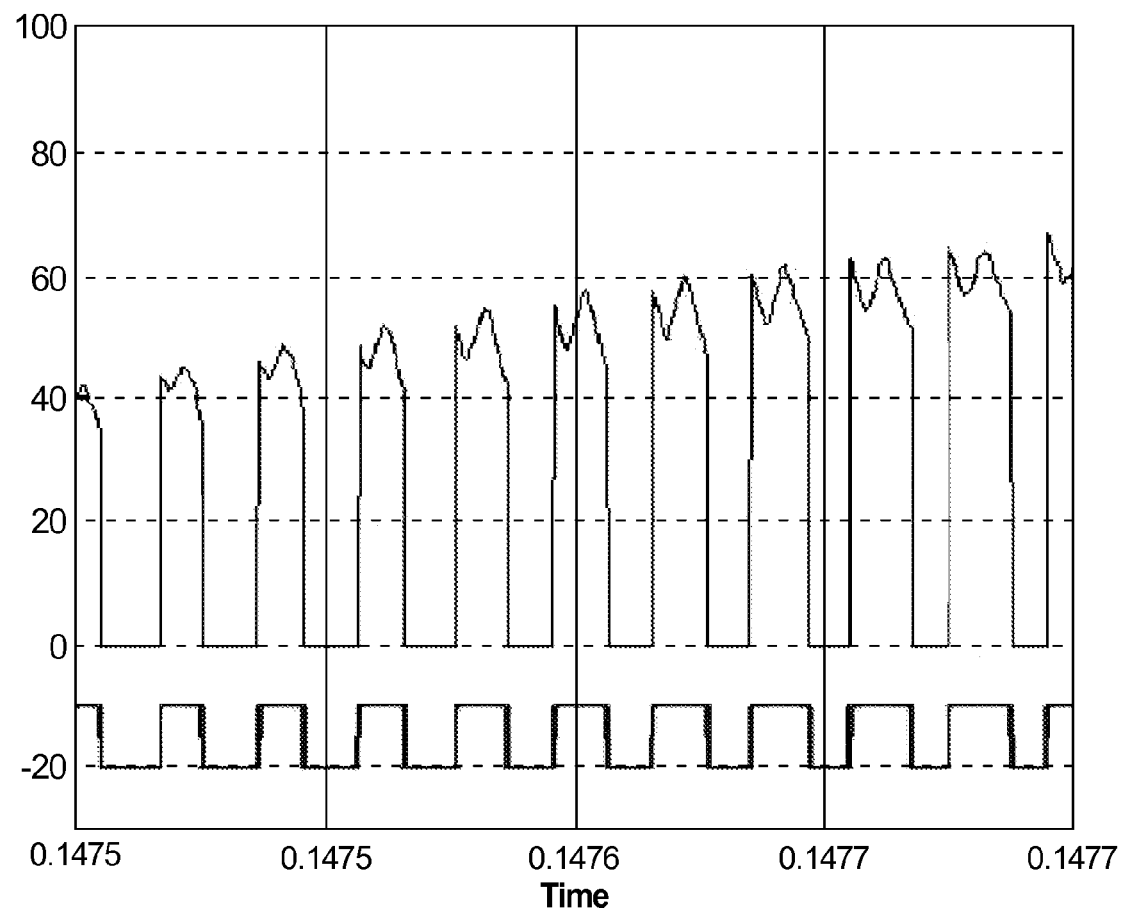
FIG. 11 is a graphical representation of an exemplary gate driver signal applied to the top synchronous rectifier switch and the derived signal of current flowing therein.
Figure 12:
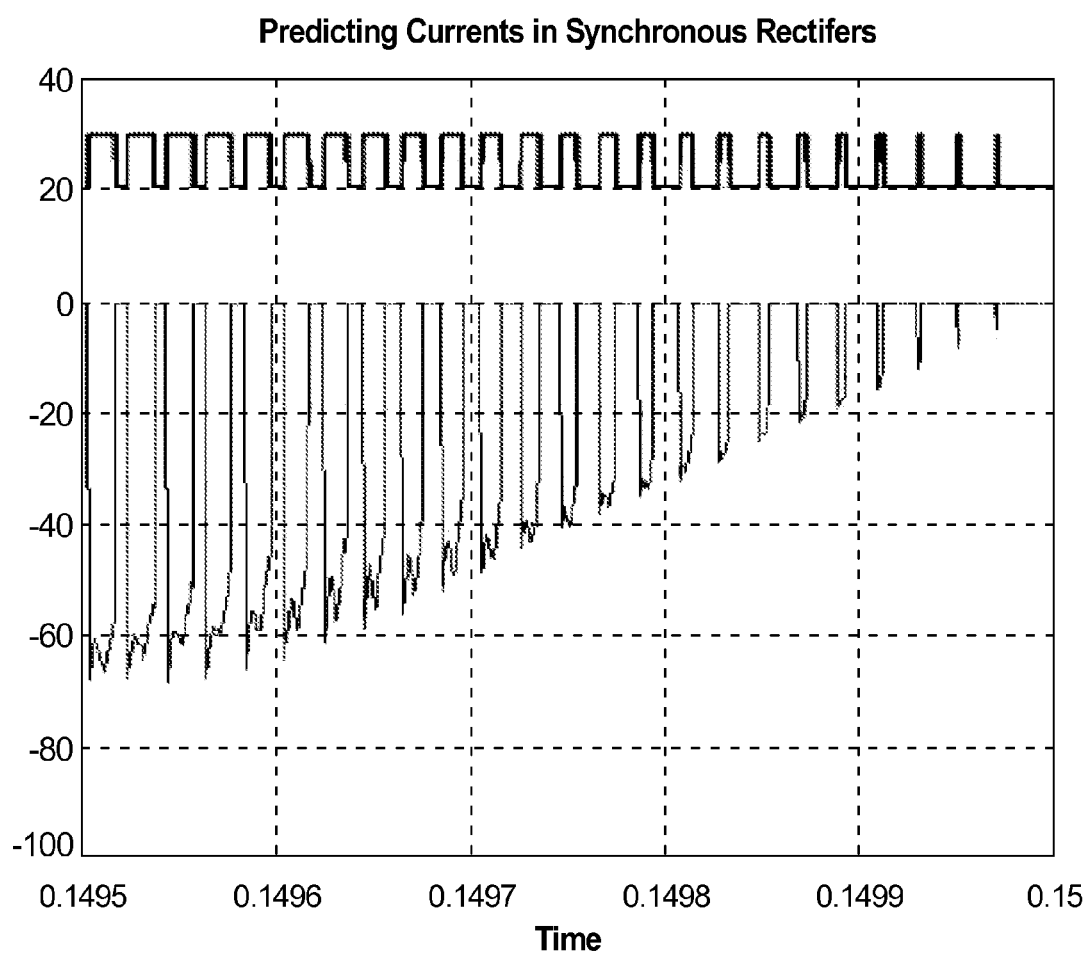
FIG. 12 is a graphical representation of an exemplary gate driver signal applied to the bottom synchronous rectifier switch and the derived signal of current flowing therein.
Figure 13:
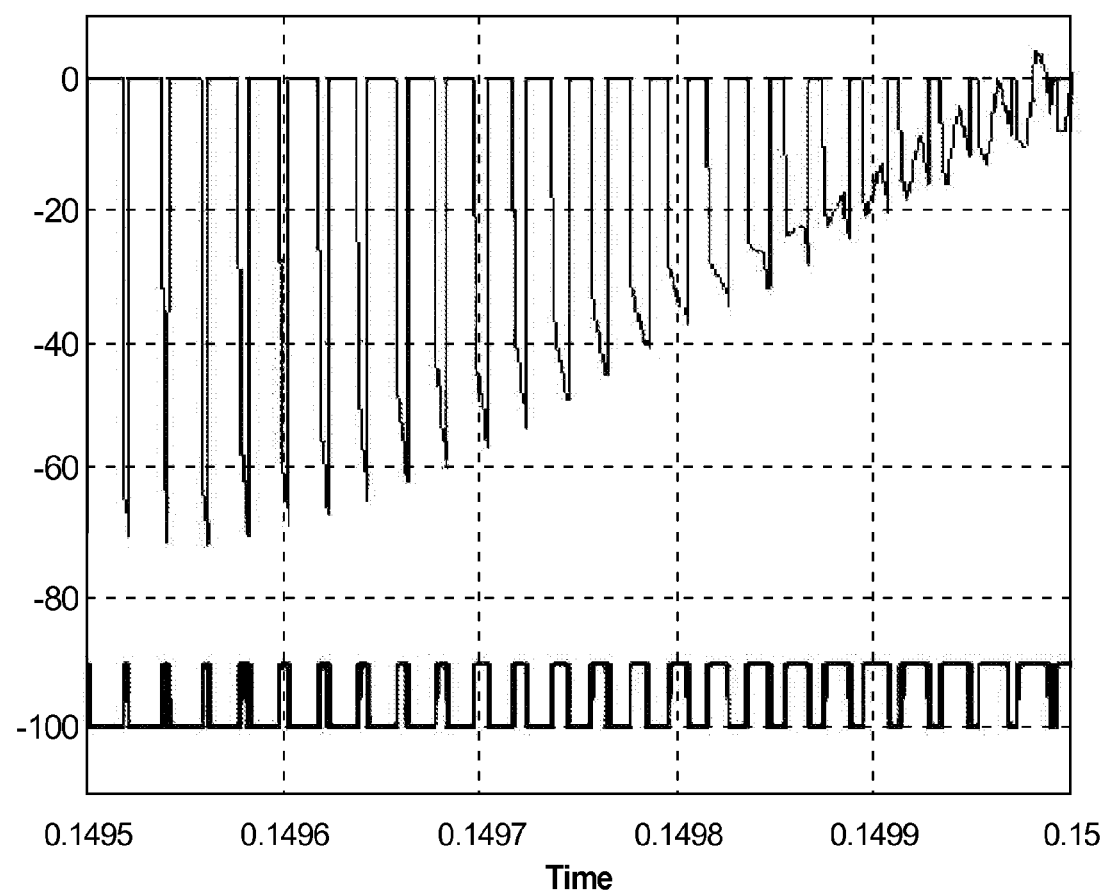
FIG. 13 is a graphical representation of an exemplary gate driver signal applied to the middle clamp switches and the derived signal of current flowing therein.

Referring now to FIGS. 11-13, there are illustrated graphical representations of the gate drive signals and derived current signals for the top, middle and bottom switches of the Vienna-type rectifier topology shown in FIGS. 2 and 6, using the gate driver signals of FIG. 10. In particular, FIG. 11 shows the gate drive signal applied to the top synchronous rectifier switch (lower plot) and the derived signal representing the current flowing in the top synchronous rectifier switch (upper plot); FIG. 12 shows the gate driver signal applied to the bottom synchronous rectifier switch (upper plot) and the derived signal representing the current flowing in the bottom synchronous rectifier switch (lower plot); and FIG. 13 shows the gate driver signal applied to the clamped middle switches (lower plot) and the derived signal representing the current flowing in the clamp middle switches (upper plot).

In sum, a method is disclosed to generate the gate driver signals applied to the top and bottom synchronous rectifier switches of a Vienna-type active rectifier. In addition, a method is disclosed to use a single current sensor per phase to sense the line current next to the active rectifier switches, to derive the current signals for all rectifier switches. This derivation can be applied in the Vienna-type active rectifiers where synchronous rectifiers are utilized to further reduce the voltage drops across the SiC Schottky diodes. The derived switch currents serve to prevent reverse current flow in the synchronous switches, which is prohibited due to unidirectional power flow constraint in aircraft power systems.

While the concepts described hereinabove are derived for SiC diodes and SiC MOSFETs, these principles can also be applied to other Silicon-based power devices as long as the use of the MOSFETs would significantly and economically further reduce the voltage drop in the diodes. Also, while the concepts described hereinabove are for the cases of using phase disposition (PD) methods of triangular modulation applied in three-level converter/inverters (as illustrated in FIG. 8), the principle of deriving the switch currents from a single sensed current signal can still be applied if any other PWM method is utilized as long as that alternative method uses the same input and then produces the equivalent output signal as shown in the PWM modulator of FIG. 8

While the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. A method of deriving switch current signals in a rectifier comprising the step of:
    sensing a line current signal from current applied to a phase leg of a VIENNA-type rectifier;
    applying the line current signal to a first analog switch, a second analog switch, and a third analog switch;
    generating a top gate driver signal, a clamp gate driver signal, and a bottom gate driver signal by pulse width modulation;
    deriving a top switch current signal by driving the first analog switch using the top gate driver signal;
    deriving a clamp switch current signal by driving the second analog switch using the clamp gate driver signal; and
    deriving a bottom switch current signal by driving the third analog switch using the bottom gate driver signal.

2. A method according to claim 1, further comprising the step of first analog switch driven by a top gate driver signal, a second analog switch driven by a clamp gate driver signal and a third analog switch driven by a bottom gate driver signal.

3. A method according to claim 1, further comprising the step of the sensing line current signal upstream from the analog switches.

4. A method according to claim 1, wherein the gate driver signals are generated by a pulse width modulator.

5. A method according to claim 1, wherein the gate driver signals include a top gate driver signal, a clamp gate driver signal and a bottom gate driver signal.

6. A method according to claim 5, wherein the top and bottom gate driver signals are delayed with respect to the clamp gate driver signal.

7. A method according to claim 1, wherein the step of generating the gate driver signals includes the step of comparing a nearly sinusoidal control signal with two triangular waveforms.

8. A method of deriving synchronous switch current signals for a three-phase rectifier comprising the step of:
    for each phase leg of a three-phase VIENNA-type rectifier:
        sensing a line current signal from current applied to the phase leg;
        applying the line current signal to a first analog switch, a second analog switch, and a third analog switch;
        generating a top gate driver signal, a clamp gate driver signal, and a bottom gate driver signal by pulse width modulation;
        deriving a top switch current signal by driving the first analog switch using the top gate driver signal;
        deriving a clamp switch current signal by driving the second analog switch using the clamp gate driver signal; and
        deriving a bottom switch current signal by driving the third analog switch using the bottom gate driver signal.

9. A method according to claim 8, further comprising the step of current signal upstream from the analog switches.

10. A method according to claim 8, further comprising the step of generated by a pulse width modulator.

11. A method according to claim 8, wherein the gate driver signals include a top gate driver signal, a clamp gate driver signal and a bottom gate driver signal.

12. A method according to claim 11, wherein the top and bottom gate driver signals are delayed with respect to the clamp gate driver signal.

13. A method according to claim 1, wherein the step of generating the gate driver signals includes the step of comparing a nearly sinusoidal control signal with two triangular waveforms.

14. A method of deriving synchronous switch current signals for a three-phase Vienna-type active rectifier comprising the step of:

for each phase leg of a three-phase VIENNA-type rectifier:
    sensing a line current signal from current applied to the phase leg;
    applying the line current signal to a first analog switch, a second analog switch, and a third analog switch;
    generating a top gate driver signal, a clamp gate driver signal, and a bottom gate driver signal by pulse width modulation;
    deriving a top switch current signal by driving the first analog switch using the top gate driver signal;
    deriving a clamp switch current signal by driving the second analog switch using the clamp gate driver signal; and
    deriving a bottom switch current signal by driving the third analog switch using the bottom gate driver signal.

15. A method according to claim 14, further comprising the step of sensed line current signals upstream from the analog switches.

16. A method according to claim 14, further comprising the step of signals are delayed with respect to the clamp gate driver signal.

* * * * *